(12) United States Patent
Sakai et al.

(10) Patent No.: US 7,488,513 B2
(45) Date of Patent: Feb. 10, 2009

(54) PROCESS FOR PRODUCING MICROCAPSULE ENCLOSING ELECTROPHORETIC PARTICLE DISPERSION, MICROCAPSULE ENCLOSING ELECTROPHORETIC PARTICLE DISPERSION AND REVERSIBLE DISPLAY MEDIUM CONTAINING THE SAME

(75) Inventors: Yoshiyuki Sakai, Tokyo (JP); Kazuhiro Jonai, Tokyo (JP); Toshiyuki Uemura, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 255 days.

(21) Appl. No.: 10/507,684

(22) PCT Filed: Mar. 20, 2003

(86) PCT No.: PCT/JP03/03434

§ 371 (c)(1),
(2), (4) Date: Sep. 22, 2004

(87) PCT Pub. No.: WO03/081331

PCT Pub. Date: Oct. 2, 2003

(65) Prior Publication Data

US 2005/0179983 A1 Aug. 18, 2005

(30) Foreign Application Priority Data

Mar. 22, 2002 (JP) ............................. 2002-079953
Dec. 9, 2002 (JP) ............................. 2002-356851

(51) Int. Cl.
*B01J 13/02* (2006.01)
(52) U.S. Cl. ............................. 427/213.3; 427/213.34; 264/4.1; 264/4.7; 366/279; 366/316; 366/317
(58) Field of Classification Search ................. 427/212, 427/213.3, 213.34; 366/279, 315–317, 343, 366/348; 264/4, 4.1, 4.7
See application file for complete search history.

(56) References Cited

U.S. PATENT DOCUMENTS

| | | | | |
|---|---|---|---|---|
| 3,964,294 A | * | 6/1976 | Shair et al. ................. | 73/61.52 |
| 5,582,484 A | * | 12/1996 | Asa ............................. | 366/149 |
| 6,017,584 A | * | 1/2000 | Albert et al. .............. | 427/213.3 |
| 6,241,921 B1 | | 6/2001 | Jacobson et al. | |
| 6,262,706 B1 | | 7/2001 | Albert et al. | |
| 6,822,782 B2 | * | 11/2004 | Honeyman et al. .......... | 359/296 |
| 2001/0006398 A1 | * | 7/2001 | Nakamura et al. .......... | 347/112 |
| 2001/0046081 A1 | * | 11/2001 | Hayashi et al. ............. | 359/296 |
| 2006/0035830 A1 | * | 2/2006 | Hunter et al. ................ | 514/12 |

FOREIGN PATENT DOCUMENTS

| | | |
|---|---|---|
| JP | 64-086116 | 3/1989 |
| JP | 04-114723 | 4/1992 |
| JP | 7-96167 | 4/1995 |
| JP | 08-281089 | 10/1996 |
| JP | 09-075699 | 3/1997 |
| JP | 2001-79379 | * 3/2001 |
| JP | 2001-255694 | * 9/2001 |
| JP | 2002-040489 | 2/2002 |

OTHER PUBLICATIONS

Machine generated English translation of JP 07-096167, generated Mar. 8, 2007.*
Kondo and Koishi; "Microcapsule and its Process, Properties, and Application", published by Sankyo Shuppan; ISBN 4782702132, (English abstract only) Nov. 20, 1987.

* cited by examiner

*Primary Examiner*—David L Sorkin
(74) *Attorney, Agent, or Firm*—Oblon, Spivak, McClelland, Maier & Neustadt, P.C.

(57) ABSTRACT

A method of producing microcapsules having an electrophoretic particle dispersion encapsulated comprises the steps of: emulsifying and dispersing a hydrophobic dispersion having electrophoretic particles dispersed in a hydrophobic medium by using a high-speed rotating stirring apparatus wherein the circumferential speed at the end of a stirring part is 2 m/s to 90 m/s, and the distance (a) between the end of the stirring part and that immobile part of the stirring apparatus which is nearest to the end of the stirring part is 0 mm<(a)<20 mm; and forming microcapsules of the emulsified and dispersed hydrophobic dispersion under stirring with a stirring blade.

10 Claims, 5 Drawing Sheets

(a)

(b)

PROCESS FOR PRODUCING MICROCAPSULE ENCLOSING ELECTROPHORETIC PARTICLE DISPERSION, MICROCAPSULE ENCLOSING ELECTROPHORETIC PARTICLE DISPERSION AND REVERSIBLE DISPLAY MEDIUM CONTAINING THE SAME

This application claims a priority of Japanese Patent Application No. 2002-79953 (filed on Mar. 22, 2002) and Japanese Patent Application No. 2002-356851 (filed on Dec. 9, 2002), which are applied by the applicant of this application, and are incorporated by reference herein.

TECHNICAL FIELD

The present invention relates to a method of effectively producing microcapsules with a uniform particle diameter having an electrophoretic particle dispersion encapsulated therein, microcapsules having an electrophoretic particle dispersion encapsulated therein, and a reversible display medium using the same.

BACKGROUND ART

Microcapsules are used in many fields such as recording materials such as pressure-sensitive recording paper and heat-sensitive recording paper, agrochemicals, medicines, perfumes, liquid crystals, and adhesives. As the method of producing microcapsules, many methods have been proposed, and known typical methods of microcapsulation include a coacervation method, an interfacial polymerization method, an in-situ polymerization method, etc. (see Kondo and Koishi: Microcapsule and Its Process, Properties, and Application, published by Sankyo Shuppan).

As information related devices have been developed in recent years, data on various kinds of information are increasing, and information is outputted in various forms. The information is outputted generally in displays using cathode-ray tubes or liquid crystals. In these displays, portability and low-energy consumption are required, and novel displays are extensively developed. As novel displays, electrophoretic displays have been proposed (see Japanese Patent Application Laid-open No. H1-86116 and U.S. Pat. Nos. 6,241,921 and 6,262,706).

The electrophoretic display is constituted by encapsulating, into microcapsules, a dispersion system having electrophoretic particles dispersed in a dispersing medium colored in a tint different from that of the particles, and arranging the microcapsules between electrodes. The electrophoretic display is a reflective display which like a liquid crystal display, does not require a backlight. Accordingly, the electrophoretic display has advantages such as reduction in the burden on users' eyes, viewability at different angles, and re-writability in a relatively short response time. Further, the electrophoretic display has memorizability by which electrophoretic particles moving to the electrodes upon application of voltage across the electrodes can be maintained in the same state for a long time even after the voltage is removed. Accordingly, the electrophoretic display is expected to have excellent performance by which no electric power is required for the time when certain display is maintained.

DISCLOSURE OF THE INVENTION

As described above, it is disclosed that a general microcapsulation method is used as the method of producing microcapsules having electrophoretic particles encapsulated therein.

For highly fine display or full-color display, finer microcapsules should be prepared, and for improvement of the contrast of display, the particle diameters of microcapsules should be made as uniform as possible. However, sifting by classification is mainly conducted at present, and therefore production efficiency is lowered, and the content of electrophoretic particles encapsulated in microcapsules is not uniform, thus deteriorating contrast.

The present invention has been achieved in order to solve the above problems, and the object of the invention is to provide a display using microcapsules having electrophoretic particles encapsulated therein, wherein the particle diameters of the microcapsules can be made small and uniform and the content of electrophoretic particles in the microcapsules can be made uniform, to enable highly fine and high-contrast display.

Specifically, the object of the invention is to provide microcapsules having a particle diameter of preferably 0.5 to 100 µm, more preferably 5 to 50 µm for achieving highly fine display and a particle diameter distribution of 50% or less, more preferably 40% or less, in terms of coefficient of variation, in order to improve contrast.

The present inventors made extensive study to solve the problems described above, and as a result, they found that the problems can be solved by using a high-speed rotating stirring apparatus wherein the circumferential speed at the end of a stirring part is 2 to 90 m/s, and the distance (a) between the end of the stirring part and an immobile part of the stirring apparatus is 0 mm<(a)<20 mm.

That is, the present invention relates to the following inventions:

A method of producing microcapsules having an electrophoretic particle dispersion encapsulated comprising the steps of: emulsifying and dispersing a hydrophobic dispersion having electrophoretic particles dispersed in a hydrophobic medium by using a high-speed rotating stirring apparatus wherein the circumferential speed at the end of a stirring part is 2 m/s to 90 m/s, and the distance (a) between the end of the stirring part and that immobile part of the stirring apparatus which is nearest to the end of the stirring part is 0 mm<(a)<20 mm; and forming microcapsules of the said emulsified and dispersed hydrophobic dispersion under stirring with a stirring blade.

The method according to claim 1, wherein said high-speed rotating stirring apparatus comprises a container in a cylindrical shape and a stirring wheel which is a cylinder arranged in the container, having approximately the same shape as that of the container, and provided with plural vents in the periphery thereof.

The method according to claim 1 or 2, wherein said circumferential speed of the stirring blade is 0.2 m/s to 5.0 m/s in forming microcapsules of the emulsified and dispersed hydrophobic dispersion.

The method according to any one of claims 1 to 3, wherein the stirring apparatus accommodated in a reaction container so as to enable stirring of a stirring blade is used in forming microcapsules of the emulsified and dispersed hydrophobic dispersion, and the ratio (d1/d2) of the blade diameter (d1) of the stirring blade to the inner diameter (d2) of the reaction container is 0.4 to 0.9, and the ratio (d1/h1) of the blade diameter (d1) to the total height (h1) of the stirring blade is 0.3 to 1.5.

The method according to any one of claims 1 to 4, wherein said electrophoretic particles comprise two or more kinds of colored particles different from one another in tint and electrophoretic mobility.

Microcapsules having an electrophoretic particle dispersion encapsulated made by the method of any one of claims 1 to 5.

A reversible display medium constituted by sandwiching the microcapsules having an electrophoretic particle dispersion encapsulated therein according to claim 6, between two opposite electrodes, at least one of which is transparent.

DESCRIPTION OF REFERENCE NUMERALS

Figure 1:
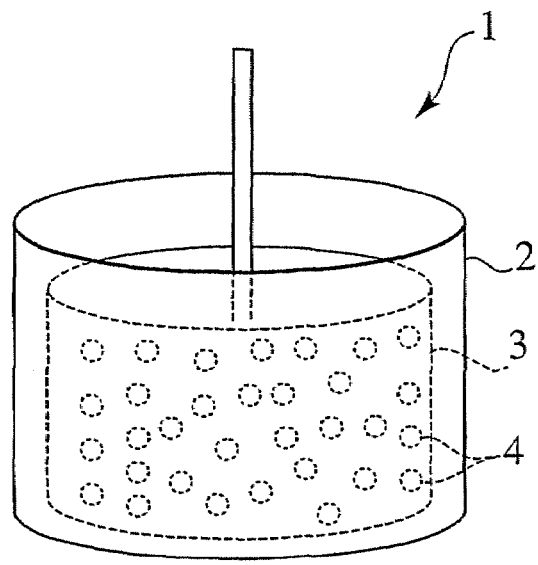
FIG. 1 is a schematic view of a high-speed rotating stirring apparatus to which a cylindrical screen-type stirring wheel has been applied.

1: High-speed rotating stirring apparatus
2: Container
3: Screen-type stirring wheel
4: Vent
5: Electrophoretic display medium
6: Substrate
7a, 7b: Electrode substrate
8: Spacer
9: Reversible display recording layer
10: Matrix phase
11: Electrophoretic particle-containing microcapsule

BEST MODE FOR CARRYING OUT THE INVENTION

The method of producing microcapsules having an electrophoretic particle dispersion encapsulated therein according to the present invention comprises at least a step of emulsifying and dispersing a hydrophobic dispersion having at least one kind of electrophoretic particles different in tint dispersed in a hydrophobic medium, in a hydrophilic medium containing a dispersion stabilizer, by using a high-speed rotating stirring apparatus and a step of forming microcapsules of the emulsified and dispersed hydrophobic dispersion under stirring with a stirring blade.

In the emulsifying and dispersing step, a high-speed rotating stirring apparatus is used, and the stirring conditions in this step are that the circumferential speed at the end of a stirring part is 2 to 90 m/s, and the distance (a) between the end of the stirring part and the immobile part of the stirring apparatus which is nearest to the end of the stirring part is 0 mm<(a)<20 mm.

The immobile part of the stirring apparatus refers to a container wall of the stirring apparatus, a part fixed to the container wall, and a fixed part which though not contacting with the container is integrated, in the vicinity of the stirring part, with the stirring part.

As the stirring conditions in the step of forming the microcapsules, the circumferential speed of the stirring blade is made 0.2 to 5.0 m/s so that after the emulsifying and dispersing step, electrophoretic particles contained uniformly in microcapsules having a particle diameter in the range of 0.5 to 100 µm with a particle diameter distribution of 50% or less in terms of coefficient of variation can be obtained in the step of forming microcapsules.

As the stirring conditions in the emulsifying and dispersing step, the circumferential speed at the end of the stirring part was defined as 2 to 90 m/s; this is because when the circumferential speed at the end of the stirring part is less than 2 m/s, the hydrophobic dispersion cannot be completely emulsified, resulting in microcapsules having a particle diameter of 100 µm or more in broad distribution with a variation coefficient of higher than 50%, and further because the content of electrophoretic particles in the larger microcapsules tends to be higher than in smaller microcapsules. On one hand, the circumferential speed at the end of the stirring part has been defined as not higher than 90 m/s because it is substantially difficult to produce the stirring apparatus wherein the circumferential speed at the end of the stirring part is higher than 90 m/s.

The distance (a) between the end of the stirring part and that immobile part of the stirring apparatus which is nearest to the end of the stirring part was defined as 0 mm<(a)<20 mm; this is because when the distance (a) between the end of the stirring part and the immobile part of the stirring apparatus is greater than 20 mm, shear applied to the hydrophobic dispersion is not sufficient, and as a result, the predetermined particle diameter, particularly a small particle diameter, cannot be attained, and the particle diameter distribution in terms of coefficient of variation is higher than 50%, and further because the content of electrophoretic particles in the microcapsules is significantly varied, thus leading to deterioration in the contrast of the resulting display.

Figure 2:
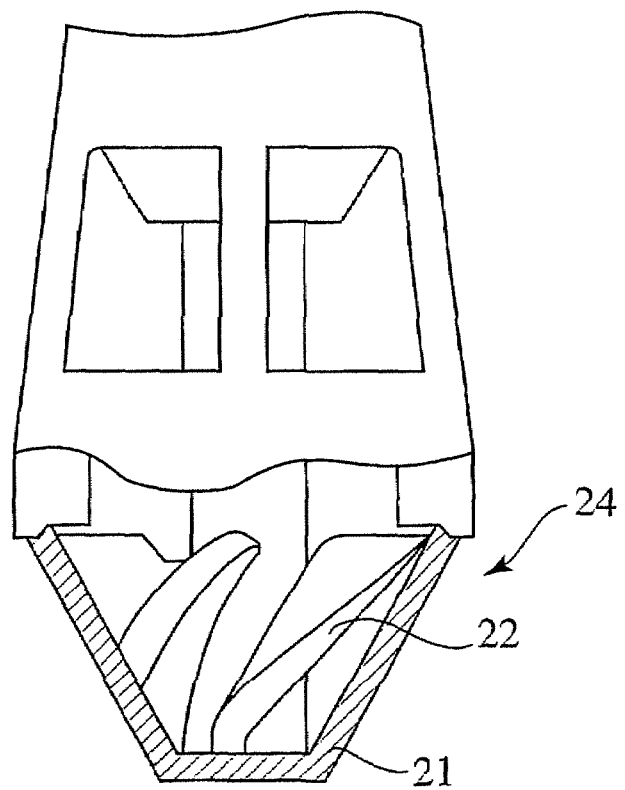
FIGS. 2 and 3 are views showing Clearmix as one example of the high-speed rotating stirring apparatus.
Figure 3A:
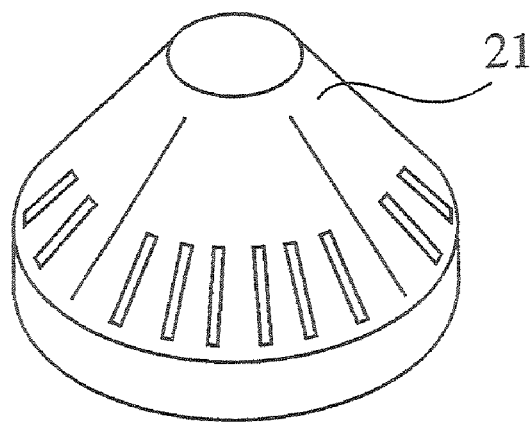
Figure 3B:
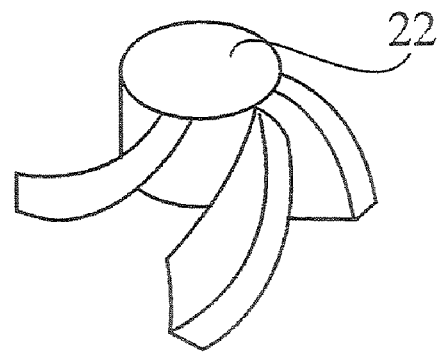
Figure 3C:
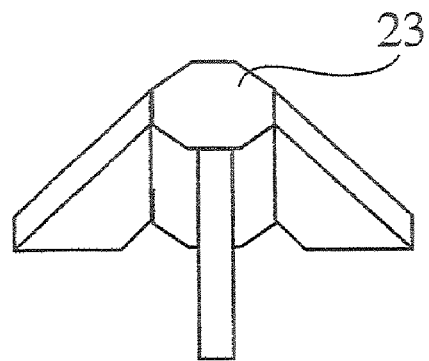
Figure 4:
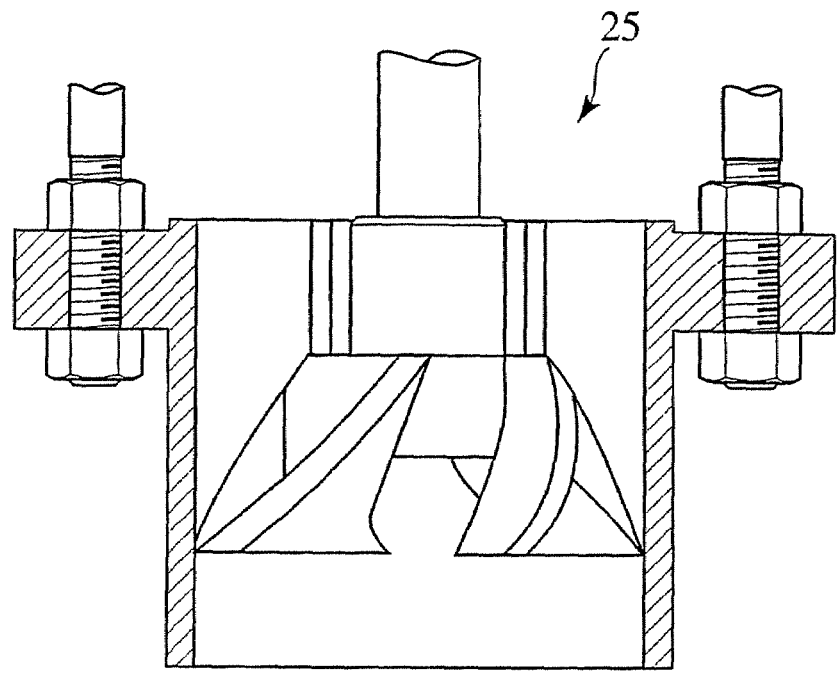
FIG. 4 is a view showing T.K. Homo mixer as one example of the high-speed rotating stirring apparatus.
Figure 4:
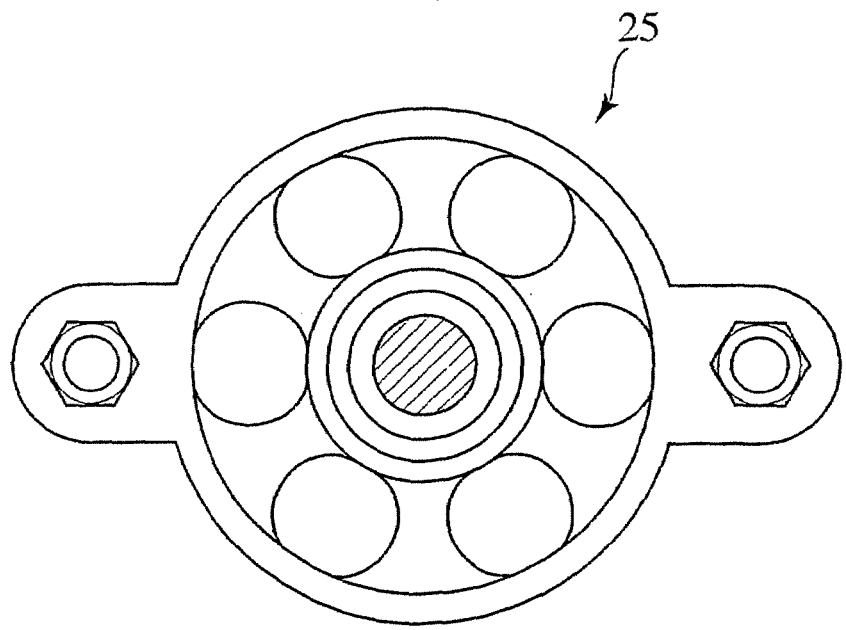

One example of the high-speed rotating stirring apparatus used in the emulsifying and dispersing step is T.K. Filmics (FIG. 1) disclosed in Japanese Patent Application Laid-open No. H4-114723 and manufactured by Tokushu Kika Kogyo Co., Ltd., Clearmix (FIGS. 2 and 3) disclosed in Japanese Patent Application Laid-open No. H4-63122 and manufactured by MTECHNIQUE Co., Ltd., and Ebara Milder disclosed in Japanese Utility Model Application Laid-Open No. H5-37333 and manufactured by Ebara Corporation. Filmics shown in FIG. 1 will be described later, and in Clearmix shown in FIGS. 2 and 3, stirring part 22 or 23 in (b) or (c) is accommodated in a stirring part-fixing part 21 in (a) shown in FIG. 3, to constitute a stirring apparatus 24 shown in FIG. 2. Other examples of the high-speed rotating stirring apparatus include T.K. Line Flow, T.K. Pipe Line Mixer, and T.K. Homo mixer (FIG. 4) manufactured by Tokushu Kika Kogyo Co., Ltd. The stirring apparatus 25 in (a) shown in FIG. 4 shows a side sectional view of T.K. Homo mixer, and (b) is a top view of the stirring apparatus 25. In these high-speed rotating stirring apparatuses, there are those usable in a batch system, a flow system or both the systems, and the high-speed rotating stirring apparatuses in any systems can be used in the present invention.

Among the high-speed rotating stirring apparatuses mentioned above, T.K. Filmics disclosed in Japanese Patent Application Laid-open No. H4-114723 and manufactured by Tokushu Kika Kogyo Co., Ltd. is preferably used.

FIG. 1 is a schematic view of a high-speed rotating stirring apparatus to which a cylindrical screen-type stirring wheel has been applied, and by way of example, T.K. Filmics manufactured by Tokushu Kika Kogyo Co., Ltd. can be mentioned. As shown in FIG. 1, the high-speed rotating stirring apparatus 1 includes at least a container 2 and a cylindrical screen-type stirring wheel 3 arranged in the container 2. The screen-type stirring wheel 3 is formed with plural vents 4 in the periphery thereof, and is constituted such that a stirred material i.e. a material to be treated can, through vents 4, pass from the inside to outside of the screen-type stirring wheel 3. The size and number of vents 4 formed on the periphery of the stirring wheel 3 are not particularly limited, but preferably vents 4 of about 0.5 to 10 mm in diameter accounts for about 30 to 70% of the whole area of the cylindrical wheel 3.

The screen-type stirring wheel 3 is accommodated in the center of the container 2, and the distance between the container 2 and the screen-type stirring wheel 3 is small, and the distance (a) between the end of the stirring part and the container, that is, the distance (a) between the container and the screen-type stirring wheel nearest to the container should be in the range of 0 mm<(a)<20 mm.

Figure 5:
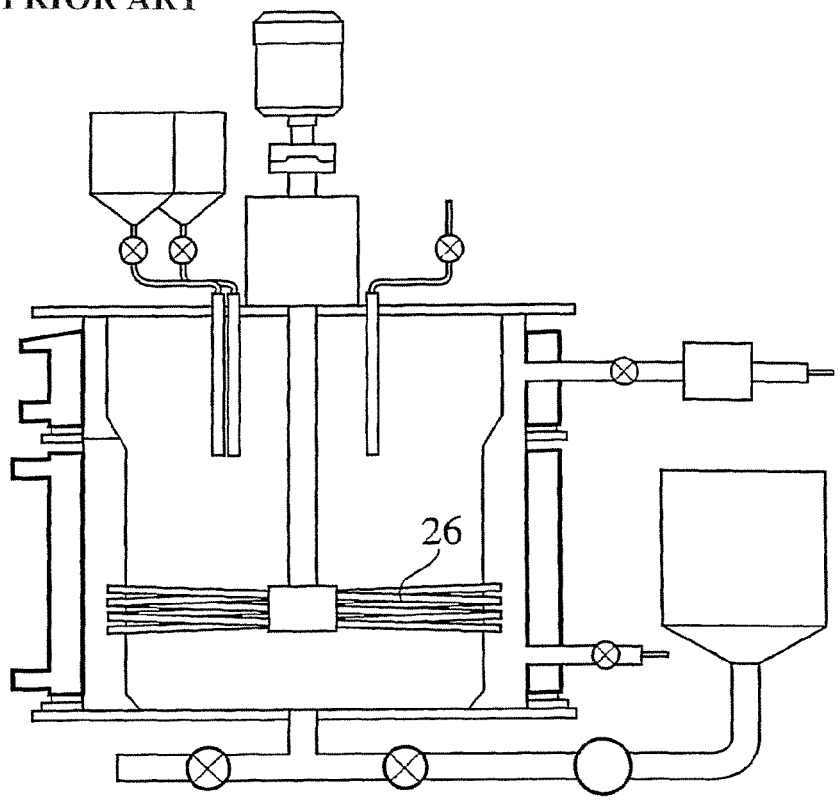
FIG. 5 is a side sectional view of a high-speed rotating stirring apparatus to which a wire brush-type wheel having a wire-shaped stirring part has been applied.
Figure 6:
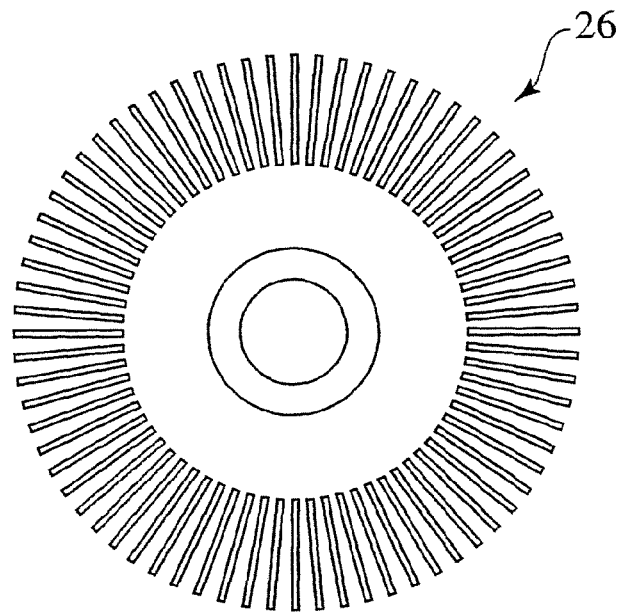
FIG. 6 is a top view of the wire brush-type wheel shown in FIG. 5.
Figure 7:
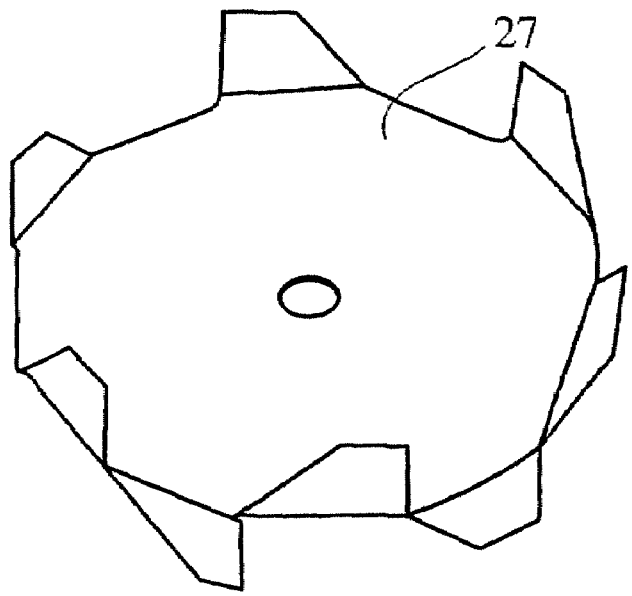
FIG. 7 is a view showing a disperse type wheel.

As the stirring wheel, the cylindrical screen-type stirring wheel 3 is illustrated, but the stirring wheel is not limited to the cylindrical screen-type stirring wheel, and as shown in FIG. 5, a wire brush-type wheel 26 having a wire-shaped stirring part may also be used. FIG. 6 shows a top view of the wire brush-type wheel 26. As the stirring part, a disper type wheel 27 shown in FIG. 7 may be attached and used.

In the step of forming microcapsules of the emulsified and dispersed hydrophobic dispersion by a high-speed rotating stirring apparatus, a high-speed rotating stirring apparatus can be used, but it is preferable that the hydrophobic dispersion is transferred to a reaction container having a container combined with a stirring blade to form microcapsules. In the step of forming microcapsules, a stirring blade hardly causing agglomeration or excessive fine dispersion should be used under suitable stirring conditions in order to maintain the particle diameter in the emulsifying and dispersing step. In the present invention, the circumferential speed of the stirring blade is preferably 0.2 to 5.0 m/s; this is because when the circumferential speed of the stirring blade is lower than 0.2 m/s, stirring is insufficient, and the emulsified and dispersed hydrophobic dispersion may agglomerated, thus failing to give capsules having the desired particle diameter, whereas when the circumferential speed of the stirring blade is higher than 5.0 m/s, the emulsified and dispersed hydrophobic dispersion may be further finely divided, thus failing to give capsules having the desired particle diameter.

The stirring blade and reaction container used in a preferable embodiment of the invention are in such dimensions that the ratio (d1/d2) of the blade diameter (d1) of the stirring blade to the inner diameter (d2) of the reaction container in the step of forming microcapsules of the emulsified and dispersed hydrophobic dispersion is 0.4 to 0.9, and the ratio (d1/h1) of the blade diameter (d1) of the stirring blade to the total height (h1) of the stirring blade 0.3 to 1.5. By using the stirring blade having a large blade area and the reaction container, the microcapsules can be formed more efficiently and stably. When the ratio (d1/d2) of the blade diameter (d1) of the stirring blade to the inner diameter (d2) of the reaction container is less than 0.4, stirring may be insufficient so that the stirring speed should be increased to stir the whole system. As a result, the emulsified and dispersed hydrophobic dispersion tends to be further finely divided. On the other hand, when the ratio is higher than 0.9, the desired effect is not increased in proportion with the force required for stirring, and accuracy in production of a reactor may be required.

When the ratio (d1/h1) of the blade diameter (d1) of the stirring blade to the total height (h1) of the stirring blade less than 0.3, the reactor in such dimensions is substantially thin and long and cannot be effective for production facilities. On the other hand, when the ratio is higher than 1.5, the stirring blade in such dimensions is similar to a usual stirring blade of small area and may thus not be effective.

The stirring blade and container described above include Max Blend stirrer disclosed in Japanese Patent Application Laid-open No. H8-281089 and manufactured by Sumitomo Heavy Industries, Ltd., Fullzone stirrer disclosed in Japanese Patent Application Laid-open No. H5-49890 and manufactured by SHINKO PANTEC Co., Ltd., Hi-F mixer disclosed in Japanese Patent Application Laid-open No. H9-75699 and manufactured by Soken Chemical & Engineering Co., Ltd., and a stirrer disclosed in Japanese Patent Application Laid-open No. H6-198155 and manufactured by Mitsubishi Heavy Industries, Ltd.

The constituent materials which can be used in the method of producing microcapsules having an electrophoretic particle dispersion encapsulated therein according to the present invention are described. First, the hydrophobic dispersing medium includes, but is not limited to, aromatic hydrocarbons such as benzene, toluene, xylene, phenyl xylyl ethane, diisopropyl naphthalene, naphthene-based hydrocarbons, aliphatic hydrocarbons such as hexane, dodecyl benzene, cyclohexane, kerosene, paraffin-based hydrocarbons, halogenated hydrocarbons such as chloroform, trichloroethylene, tetrachloroethylene, trifluoroethylene, tetrafluoroethylene, dichloromethane, ethyl bromide, etc., phosphates such as tricresyl phosphate, trioctyl phosphate, octyldiphenyl phosphate, tricyclohexyl phosphate, etc., phthalates such as dibutyl phthalate, dioctyl phthalate, dilauryl phthalate, dicylohexyl phthalate, etc., carboxylates such as butyl oleate, diethylene glycol dibenzoate, dioctyl sebacate, dibutyl sebacate, dioctyl adipate, trioctyl trimellitate, acetyl triethyl citrate, octyl maleate, dibutyl maleate, ethyl acetate, etc., isopropyl biphenyl, isoamyl biphenyl, chlorinated paraffin, diisopropyl naphthalene, 1,1-ditriethane, 1,2-ditolylethane, 2,4-di-tertiary aminophenol and N,N-dibutyl-2-butoxy-5-tertiary octylaniline. These organic solvents can be used alone or as a mixture of two or more thereof.

As the hydrophobic dispersing medium, both colorless and colored dispersing mediums can be used. When two kinds of particles such as positively charged particles and negatively charged particles, or positively or negatively charged particles and uncharged particles, are used as the electrophoretic particles, a colorless hydrophobic dispersing medium is used, but when one kind of electrophoretic particles are used, a dispersing medium having a dyestuff dissolved therein is used as a colored hydrophobic dispersing medium.

The dyestuff which can be used therein include oil-soluble dyestuffs, and examples include Sprit Black (SB, SSBB, AB), Nigrosine Base (SA, SAP, SAPL, EE, EEL, EX, EXBP, EB), Oil Yellow (105, 107, 129, 3G, GGS), Oil Orange (201, PS, PR), First Orange, Oil Red (5B, RR, OG), Oil Scarlet, Oil Pink 312, Oil Violet #730, Macrolex Blue RR, Sumiplast Green G, Oil Brown (GR, 416), Sudan Black X60, Oil Green (502, BG), Oil Blue (613, 2N, BOS), Oil Black (HBB, 860, BS), Valli First Yellow (1101, 1105, 3108, 4120), Valli First Orange (3209, 3210), Valli First Red (1306, 1355, 2303, 3304, 3306, 3320) Valli First Pink 2310N, Valli First Brown (2402, 3405), Valli First Blue (3405, 1501, 1603, 1605, 1607, 2606, 2610), Valli FirstViolet (1701, 1702), Valli FirstBlack (1802, 1807, 3804, 3810, 3820, 3830), etc.

The electrophoretic particles which can be used in the method of producing microcapsules having an electrophoretic particle dispersion encapsulated therein according to the present invention include inorganic pigment particles and organic pigment particles.

The inorganic pigment particles include, for example, white lead, zinc white, lithopone, titanium dioxide, zinc sulfide, antimony oxide, calcium carbonate, kaolin, mica, barium sulfate, gloss white, alumina white, talc, silica, calcium silicate, cadmium yellow, cadmium lithopone yellow, yellow oxide, titanium yellow, titanium barium yellow, cadmium orange, cadmium lithopone orange, molybdate orange, red oxide, red lead, silver red, cadmium red, cadmium lithopone red, amber, brown iron oxide, iron zinc brome brown, chrome green, chrome oxide, pyridian, cobalt green, cobalt chrome green, titanium cobalt green, Prussian blue, cobalt blue, ultramarine, cerulean blue, cobalt aluminum chrome blue, cobalt violet, mineral violet, carbon black, iron black, manganese ferrite black, cobalt ferrite black, copper chrome black, copper chrome manganese black, titanium black, aluminum powder, copper powder, lead powder, tin powder, zinc powder, etc.

The organic pigment particles include, for example, fast yellow, disazo yellow, condensed azo yellow, anthrapyrimidine yellow, isoindoline yellow, copper azomethine yellow, quinophthaloin yellow, benzimidazolone yellow, nickel dioxime yellow, monoazo yellow lake, dinitroaniline orange, pyrazolone orange, perinone orange, naphthol red, toluidine red, permanent carmine, brilliant fast scarlet, pyrazolone red, rhodamine 6G lake, permanent red, lithol red, BON lake red, lake red, brilliant carmine, Bordeaux 10B, naphthol red, quinacridone magenta, condensed azo red, naphthol carmine, perylene scarlet, condensed azo scarlet, benzimidazolone carmine, anthraquinonyl red, perylene red, perylene maroon, quinacridone maroon, quinacridone scarlet, quinacridone red, diketopyrrolopyrrole red, benzimidazolone brown, phthalocyanine green, Victoria blue lake, phthalocyanine blue, fast sky blue, alkali blue toner, indanthrone blue, rhodamine B lake, methyl violet lake, dioxazine violet, naphthol violet, etc.

As the electrophoretic particles, fine polymer particles can be used. The fine polymer particles can be produced by a conventionally known methods which includes, but is not limited to, a method of using emulsion polymerization, a seed emulsion polymerization method, a soap-free polymerization method, a dispersion polymerization method and a suspension polymerization method. Materials of the fine polymer particles include, but are not limited to, polymer materials based on styrene, styrene-acryl, styrene-isoprene, divinyl benzene, methyl methacrylate, methacrylate, ethyl methacrylate, ethyl acrylate, n-butyl acrylate, acrylic acid, acrylonitrile, acryl rubber-methacrylate, ethylene, ethylene-acrylic acid, nylon, silicone, urethane, melamine, benzoguanamine, phenol, fluorine(tetrachloroethylene), vinylidene chloride, quaternary pyrimidinium salt, synthetic rubber, cellulose, acetate cellulose, chitosan and calcium alginate. If necessary, the fine polymer particles used in the present invention can be stained with a dye or colored by incorporation of pigment particles.

Preferably, these pigment components are used not only as fine particles of only a pigment, but also in a surface-treated state. As the method of surface treatment in this case, various methods usually carried out for pigment particles can be applied, and for example, the surface of the pigment are coated with various compounds including polymers or subjected to coupling treatment with various coupling agents based on titanate, silane, etc., or subjected to graft polymerization treatment. These pigment particles can be used after subjected to mechanochemical treatment, or can be used as composite particles formed from pigment particles or as polymer particles/hollow polymer particles, or as composite particles formed from various resins.

The particle diameter of these electrophoretic particles is preferably 0.01 to 10 µm, more preferably 0.05 to 5 µm, but is not limited to such particle diameters.

For the purpose of regulation of charging of the electrophoretic particles and improvement of dispersibility, a wide variety of conventionally used dispersants can be used in the hydrophobic dispersing medium used in the microcapsules having an electrophoretic particle dispersion encapsulated therein according to the present invention. As these dispersants, ionic surfactants such as nonionic surfactants, anionic surfactants, cationic surfactants and amphoteric surfactants, which can be dissolved or mixed in a dispersed state in the dispersing medium, can be used singly or as a mixture of two or more thereof.

As these dispersants, the nonionic surfactants include, for example, polyoxyalkylene alkyl phenol ethers such as polyoxyethylene nonyl phenol ether, polyethylene dinonyl phenyl ether, polyoxyethylene octyl phenol ether, polyoxyethylene styrenated phenol, polyoxypolyoxyethylene bisphenol A, polyoxyethylene nonyl phenyl ether, polyoxyethylene octyl phenyl ether, nonyl phenol ethoxylate etc., polyoxyalkylene ethers such as polyoxyethylene castor oil, polyoxyalkylene block polymer, polyoxyethylene cetyl ether, polyoxyethylene lauryl ether, polyoxyethylene oleyl ether, polyoxyethylene stearyl ether, polyoxypropylene ether etc., glycols such as monool type polyoxyalkylene glycol, diol type polyoxyalkylene glycol, triol type polyoxyalkylene glycol, monool-based block type polyalkylene glycol, diol-based block type polyalkylene glycol, random type polyalkylene glycol etc., primary linear alcohol ethoxylate and secondary linear alcohol ethoxylate such as octyl phenol ethoxylate, oleyl alcohol ethoxylate, lauryl alcohol ethoxylate etc., alkyl alcohol ethers such as multinuclear phenol ethoxylate etc., polyoxyalkylene alkyl esters such as polyoxyethylene rosin ester, polyoxyethylene lauryl ester, polyoxyethylene oleyl ester, polyoxyethylene stearyl ester etc., sorbitan fatty esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate, sorbitan sesquistearate etc., polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, polyoxyethylene sorbitan sesquistearate etc., fatty esters such as methyl saturated fatty ester, methyl unsaturated fatty ester, butyl saturated fatty ester, butyl unsaturated fatty ester, stearyl saturated fatty ester, stearyl unsaturated fatty ester, octyl saturated fatty ester, octyl unsaturated fatty ester, stearic acid polyethylene glycol ester, oleic acid polyethylene glycol ester, rosin polyethylene glycol ester, etc., fatty acids such as stearic acid, oleic acid, palmitic acid, lauric acid, myristic acid, etc. and amidated compounds of these fatty acids, polyoxyethylene alkyl amines such as polyoxyethylene lauryl amine, polyoxyethylene alkyl amine, polyoxyethylene alkyl amine ether, etc., higher fatty acid monoethanol amides and higher fatty acid diethanol amides such as lauryl acid monoethanol amide, coconut fatty acid diethanolamide, etc., amide compounds such as polyoxyethylene stearic acid amide, coconut diethanolamide (1-2 type/1-1 type), alkyl alkylol amide, etc., alkanol amides, alkanol amines represented by R—($CH_2CH_2O$)mH($CH_2CH_2O$)nH, R—NH—$C_3H_6$—$NH_2$ [R=oleyl, octyl, dodecyl, tetradecyl, hexadecyl, octadecyl, coconut, tallow, soybean, etc.], primary amines represented by R—$NH_2$ [R=oleyl, octyl, dodecyl, tetradecyl, hexadecyl, octadecyl, coconut, tallow, soybean, etc.], secondary amines represented by $R^1R^2$—NH [$R^1 \cdot R^2$=R=oleyl, octyl, dodecyl, tetradecyl, hexadecyl, octadecyl, coconut, tallow, soybean, etc.], tertiary amines represented by $R^1R^2R^3$N [$R^1 \cdot R^2 \cdot R^3$=oleyl, octyl, dodecyl, tetradecyl, hexadecyl, octadecyl, coconut, tallow, soybean, etc.], various synthetic higher alcohols, various naturally occurring higher alcohols, polymers and oligomers such as acrylic acid-based compounds, polycarboxylic acid-based compounds, hydroxy fatty acid oligomers and modified hydroxy fatty acid oligomers.

The anionic surfactants that can be used include, for example, carboxylates such as polycarboxylic acid-based polymer surfactant, polycarboxylic acid-based anionic surfactant, special fatty acid soap, rosin soap, etc., castor oil sulfates, alcohol sulfate salts, lauryl alcohol ether sulfate amine salts and lauryl alcohol ether sulfate Na salts such as lauryl alcohol fatty ester Na salt, lauryl alcohol sulfate amine salt, naturally occurring alcohol sulfate Na salt, higher alcohol sulfate Na salt, etc, sulfate salts such as synthetic higher alcohol ether sulfate amine salt, synthetic higher alcohol ether sulfate Na salt, alkyl polyether sulfate amine salt, alkyl polyether sulfate Na salt, natural alcohol EO (ethylene oxide) adduct-based sulfate amine salt, natural alcohol EO (ethylene oxide) adduct-based sulfate Na salt, synthetic alcohol EO (ethylene oxide) adduct-based sulfate amine salt, synthetic alcohol EO (ethylene oxide) adduct-based sulfate Na salt, alkyl phenol EO (ethylene oxide) adduct-based sulfate amine salt, alkyl phenol EO (ethylene oxide) adduct-based sulfate Na salt, polyoxyethylene nonyl phenyl ether sulfate amine salt, polyoxyethylene nonyl phenyl ether sulfate Na salt, polyoxyethylene polycyclic phenyl ether sulfate amine salt, polyoxyethylene polycyclic phenyl ether sulfate Na salt, etc. sulfonates such as various alkyl allyl sulfonate amine salts, various alkyl allyl sulfonate Na salts, naphthalene sulfonic acid amine salt, naphthalene sulfonic acid Na salts, various alkyl benzene sulfonic acid amine salts, various alkyl benzene sulfonic acid Na salts, naphthalene sulfonic acid condensate, naphthalene sulfonic acid/formalin condensate, etc., polyoxyalkylene-based sulfonates such as polyoxyethylene nonyl phenyl ether sulfonic acid amine salt, polyoxyethylene nonyl phenyl ether sulfonic acid Na salt, polyoxyethylene special allyl ether sulfonic acid amine salt, polyoxyethylene special allyl ether sulfonic acid Na salt, polyoxyethylene tridecyl phenyl ether sulfonic acid amine salt, polyoxyethylene tridecyl phenyl ether sulfonic acid Na salt, polyoxyethylene alkyl ether sulfonic acid amine salt, polyoxyethylene alkyl ether sulfonic acid Na salt, etc., sulfosuccinates such as dialkyl sulfosuccinate amine salt, dialkyl sulfosuccinate Na salt, polycyclic phenyl polyethoxy sulfosuccinate amine salt, polycyclic phenyl polyethoxy sulfosuccinate Na salt, polyoxyethylene alkyl ether sulfosuccinic acid monoester amine salt, polyoxyethylene alkyl ether sulfosuccinic acid monoester Na salt, etc., and phosphates such as alkyl phosphate, alkoxyalkyl phosphate, higher alcohol phosphate, higher alcohol phosphate, alkyl phenol phosphate, aromatic phosphate, polyoxyalkylene alkyl ether phosphate, polyoxyalkylene alkyl allyl ether phosphate, etc.

The cationic surfactants which can be used include, for example, quaternary ammonium salts such as alkyl trimethyl amine quaternary ammonium salts, tetramethyl amine salts and tetrabutyl amine salts, represented by R—N($CH_3$) 3X [R=stearyl, cetyl, lauryl, oleyl, dodecyl, coconut, soybean, tallow, etc./X=halogen, amine, etc.], acetates represented by ($RNH_3$) ($CH_3$COO) [R=stearyl, cetyl, lauryl, oleyl, dodecyl, coconut, soybean, tallow, etc.], benzyl amine quaternary ammonium salts such as lauryl dimethyl benzyl ammonium salts (halogen salt, amine salt, etc.), stearyl dimethyl benzyl ammonium salts (halogen salt, amine salt, etc.) and dodecyl dimethyl benzyl ammonium salts (halogen salt, amine salt, etc.), and polyoxyalkylene quaternary ammonium salts represented by R($CH_3$)N($C_2H_4$O)mH($C_2H_4$O)n.X [R=stearyl, cetyl, lauryl, oleyl, dodecyl, coconut, soybean, etc./X=halogen, amine, etc.].

The amphoteric surfactants which can be used include, for example, various betaine surfactants, various imidazoline surfactants, β-alanine surfactants, polyoctyl aminoethyl glycine hydrochloride, etc. Other protective colloidal agents can also be used.

The microcapsules having an electrophoretic particle dispersion encapsulated therein according to the present invention can be prepared by the conventionally used in-situ method, interfacial polymerization method or coacervation method, and the wall material of the microcapsules includes polyurethane, polyurea, polyurea-polyurethane, amino resin, polyamide, acrylate, methacrylate, vinyl acetate, gelatin, etc. The size of the microcapsules used in the present invention is about 0.5 to 100 μm, preferably about 5 to 50 μm.

When the microcapsules are to be prepared, the hydrophobic dispersion should first be emulsified and dispersed in a hydrophilic medium. The hydrophilic medium is most preferably water, but depending on the case, a water-miscible organic solvent such as alcohol may be added. In emulsification and dispersion, protective colloids such as water-soluble polymeric compounds and fine inorganic particles are used.

The water-soluble polymeric compounds which can be used include, for example, acrylic acid polymers, methacrylic acid copolymers (acrylates such as methyl acrylate, and copolymers of acrylic acid amide, acrylonitrile, 2-methyl propane sulfonic acid, styrene sulfonic acid, vinyl acetate, etc.), maleic acid copolymers (copolymers of maleic acid with styrene, ethylene, propylene, methyl vinyl ether, vinyl acetate, isobutylene or butadiene), carboxymethyl cellulose, methyl cellulose, hydroxyethyl cellulose, gelatin, gum arabic, starch derivatives, polyvinyl alcohol, etc. The fine inorganic particles which can be used include, for example, talc, bentonite, organic bentonite, white carbon, colloidal silica, colloidal alumina, fine silica particles, calcium carbonate, calcium sulfate, etc.

For controlling the emulsified state, other nonionic surfactants and ionic surfactants can be used.

Hereinafter, a typical method of synthesizing the microcapsules used in the present invention is described. In the in-situ method, polyurethane, polyurea, polyurea-polyurethane, urea-formaldehyde resin, melamine-formaldehyde resin, acrylate, methacrylate, vinyl acetate, etc. can be used as the wall material.

When polyurethane, polyurea or polyurea-polyurethane is used as the wall material, the polyvalent isocyanate compound used therein is an organic compound having two or more isocyanate groups in the molecule. As the polyvalent isocyanate compound, it is possible to employ, for example, diisocyanates such as m-phenylene diisocyanate, p-phenylene diisocyanate, 2,6-tolylene diisocyanate, 2,4-tolylene diisocyanate, naphthalene-1,4-diisocyanate, diphenyl methane-4,4'-diisocyanate, 3,3'-dimethoxy-4,4'-biphenyl diisocyanate, 3,3'-dimethyl diphenyl methane-4,4'-diisocyanate, xylylene-1,4-diisocyanate, 4,4'-diphenyl propane diisocyanate, trimethylene diisocyanate, hexamethylene diisocyanate, propylene-1,2-diisocyanate, butylene-1,2-diisocyanate, cyclohexylene-1,2-diisocyanate, cyclohexylene-1,4-diisocyanate, etc., triisocyanates such as p-phenylene diisothiocyanate, xylylene-1,4-diisothiocyanate, ethylidene diisothiocyanate, etc., and tetraisocyanates such as 4,4'-dimethyldiphenyl methane-2,2',5,5'-tetraisocyanate. As the polyvalent isocyanate compound, it is possible to employ, for example, polyvalent isocyanate prepolymers such as a hexamethylene diisocyanate/hexane triol adduct, a 2,4-tolylene diisocyanate/prenzcatecohol adduct, a tolylene diisocyanate/hexane triol adduct, a tolylene diisocyanate/trimethylol propane adduct, a xylylene diisocyanate/trimethylol propane adduct, a hexamethylene diisocyanate/trimethylol propane adduct, etc.

As the polyvalent isocyanate compound, a prepolymerized compound can also be used. Two or more of the compounds described above can be simultaneously used. On one hand, the film-forming material having reactivity with the polyvalent isocyanate compound includes a material having two or more active hydrogen atoms in the molecule, such as polyvalent alcohols, hydroxy polyesters, hydroxy polyalkylene ethers, polyamine alkylene oxide adducts, and polyvalent amines.

As the polyvalent alcohol, an aliphatic, aromatic or alicyclic polyvalent alcohol may be used, and use can be made of, for example, catechol, resorcinol, 1,2-dihydroxy-4-methyl benzene, 1,3-dihydroxy-5-methyl benzene, 3,4-dihydroxy-1-methyl benzene, 3,5-dihydroxy-1-methyl benzene, 2,4-dihydroxyethyl benzene, 1,3-naphthalene diol, 1,5-naphthalene diol, 2,7-naphthalene diol, 2,3-naphthalene diol, o,o'-biphenol, p,p'-biphenol, bisphenol A, bis-(2-hydroxyphenyl)methane, xylylene diol, ethylene glycol, 1,3-propylene glycol, 1,4-butylene glycol, 1,5-pentane diol, 1,6-hexane diol, 1,7-heptane diol, 1,8-octane diol, 1,1,1-trimethylol propane, hexane triol, pentaerythritol, glycerin, sorbitol, etc.

The hydroxy polyalkylene ethers include hydroxy polyesters obtained from the polyvalent alcohols and polycarboxylic acids such as malonic acid, succinic acid, glutaric acid, adipic acid, pimelic acid, maleic acid, isophthalic acid, terephthalic acid and gluconic acid, and the hydroxy polyalkylene ethers include hydroxy polyalkylene ethers as condensed products of the polyvalent alcohol and an alkylene oxide such as ethylene oxide, propylene oxide or butylene oxide, and the polyvalent amine alkylene oxide adduct includes adducts comprising polyvalent amines such as o-phenylene diamine, p-phenylene diamine, diaminonaphthalene, ethylene diamine, 1,3-propylene diamine, diethylene triamine, triethylene tetramine and 1,6-hexamethylene diamine whose amino group is substituted with at least one of the alkylene oxides described above.

As the polyvalent amines, it is possible to employ, for example, diethylene triamine, triethylene tetramine, tetraethylene pentamine, 1,6-hexamethylene diamine, 1,8-octamethylene diamine, 1,12-dodecamethylene diamine, o-phenylene diamine, p-phenylene diamine, m-phenylene diamine, o-xylylene diamine, p-xylylene diamine, m-xylylene diamine, menthane diamine, bis(4-amino-3-methylcyclohexyl) methane, isophoronediamine, 1,3-diaminocyclohexane, spiroacetal-based diamines. Water can also be used as the film-forming material having reactivity with the polyvalent isocyanate.

Fundamentally, the method of producing the microcapsules having an electrophoretic particle dispersion encapsulated therein according to the present invention comprises the following steps. First, a protective colloid-containing aqueous solution is prepared. When a water-soluble polymer is used as the protective colloid, 0.2 to 10 parts by weight, preferably 0.5 to 5 parts by weight of the water-soluble polymer is used in 100 parts by weight of water, and when fine inorganic particles are used as the protective colloid, 0.1 to 100 parts by weight, preferably 1 to 50 parts by weight of the fine inorganic particles are preferably used in 100 parts by weight of water.

Electrophoretic particles, a polyvalent isocyanate compound, a polyvalent alcohol and if necessary a polyvalent amine are then mixed with a hydrophobic dispersing medium to prepare a hydrophobic dispersion. This hydrophobic dispersion is emulsified and dispersed in the aqueous protective colloid solution prepared in the above step. In emulsification and dispersion, the mixture is emulsified and dispersed by stirring it at 5000 rpm for 5 minutes with a high-speed rotating stirring apparatus such as Clearmix (manufactured by MTECHNIQUE Co., Ltd.). The amount of the electrophoretic particles used is in the range of 0.1 to 20 parts by weight, preferably 1 to 10 parts by weight, relative to 100 parts by weight of the hydrophobic dispersion. The amount of the polyvalent isocyanate compound used is in the range of 1 to 50 parts by weight, preferably 5 to 20 parts by weight, relative to 100 parts by weight of the hydrophobic dispersion. The amount of the polyvalent alcohol or polyvalent amine used is in the range of 1 to 50 parts by weight, preferably 5 to 20 parts by weight, relative to 100 parts by weight of the hydrophobic dispersion.

The resulting emulsified dispersion is heated at a predetermined temperature to react the polyvalent isocyanate with the polyvalent alcohol and/or polyvalent amine, whereby the objective microcapsules can be obtained.

When acrylate, methacrylate, vinyl acetate, etc. are used as the wall material, the radical polymerizable monomer that can be used in the present invention is for example at least one member selected from aromatic monomers such as styrene, α-methylstyrene, p-methylstyrene, t-butylstyrene, chlorostyrene, benzyl acrylate, benzyl methacrylate and vinyl toluene, alkyl acrylates such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate, alkyl methacrylates such as methyl methacrylate, propyl methacrylate, n-butyl methacrylate, isobutyl methacrylate, n-amyl methacrylate, n-hexyl methacrylate, 2-ethylhexyl methacrylate, n-octyl methacrylate, decyl methacrylate and dodecyl methacrylate, hydroxyl-containing monomers such as hydroxyethyl acrylate, hydroxypropyl acrylate, hydroxyethyl methacrylate and hydroxypropyl methacrylate, N-substituted acrylic or methacrylic monomers such as N-methylol acrylamide, N-butoxymethyl acrylamide, N-methylol methacrylamide and N-butoxymethyl methacrylamide, carboxyl-containing monomers such as polymerizable unsaturated carboxylic acids such as acrylic acid, methacrylic acid, itaconic acid, maleic acid, fumaric acid and crotonic acid or anhydrides thereof, epoxy-containing monomers such as glycidyl acrylate and glycidyl methacrylate, acrylonitrile, methacrylonitrile, croton nitrile, vinyl acetate, vinyl chloride and vinylidene chloride.

In the present invention, multifunctional (thus crosslinking) monomers such as methylene bisacrylamide, divinyl benzene, tripropylene glycol diacrylate, bisphenol A, diglycidyl ether diacrylate, trimethylol propane triacrylate, acrylated cyanurate, etc. can be used together with the radical polymerizable monomers described above.

When the radical polymerizable monomer is used, the radical polymerization initiator that can be used in the present invention includes organic peroxides such as lauroyl peroxide, benzoyl peroxide, methyl ethyl ketone peroxide, cyclohexanone peroxide, 2,2-bis(t-butylperoxy)valerate, di-t-butyl peroxide, dicumyl peroxide and octanoyl peroxide, and azo compounds such as 2,2-azobis(2,4-dimethylvaleronitrile), 2,2-azobis(2-methylbutyronitrile), 1,1-azobis(cyclohexyl-1-carbonitrile), VA-061, VA-080, VR-110, V-601 (any of which are available from Wako Pure Chemical Industries, Ltd.), etc.

Inorganic peroxides such as ammonium peroxide, sodium peroxide, etc. can also be used. These initiators can be used alone, or may be used as a redox type by combination with a reducing agent such as Rongalit. As a chain transfer agent for regulating the molecular weight, octyl thioglycolate, methoxybutyl thioglycolate, octyl mercaptopropionate, methoxybutyl mercaptopropionate, mercaptan such as stearyl mercaptan, and α-methyl styrene dimers can be used.

In the emulsifying and dispersing step, electrophoretic particles, radical polymerizable monomers, a radical polymerization initiator, and if necessary a chain transfer agent are mixed with a hydrophobic dispersing medium to prepare a hydrophobic dispersion. This hydrophobic dispersion is emulsified and dispersed in an aqueous protective colloid solution in the same manner as described above. In emulsification and dispersion, the mixture is emulsified and dispersed by stirring it at 5000 rpm for 5 minutes with a high-speed rotating stirring apparatus such as Clearmix (manufactured by MTECHNIQUE Co., Ltd.). The amount of the radical polymerizable monomers used is in the range of 1 to 90 parts by weight, preferably 10 to 50 parts by weight, relative to 100 parts by weight of the hydrophobic dispersion. The amount of the radical polymerization initiator used is not particularly limited, but is usually in the range of 0.1 to 10 parts by weight, preferably 0.1 to 5 parts by weight, relative to 100 parts by weight of the radical polymerizable monomers.

In radical polymerization by the in-situ method, the radical polymerizable monomers and the radical polymerizable initiator can be polymerized not by mixing them in a hydrophobic dispersing medium but by dissolving them in water. In this case, the radical polymerizable monomers and the radical polymerization initiator are used preferably in such a range as to be dissolved in water.

The resulting emulsified dispersion is heated to a predetermined temperature to initiate radical polymerization, whereby the objective microcapsules can be obtained.

When amino resin is used as the wall material, its components which can be used in the present invention include, for example, melamine/formaldehyde initial polymers, urea/formaldehyde initial polymers, alkylated methylol urea alkylated methylol melamine, N-alkylmelamine/formaldehyde initial polymers, guanamine/formaldehyde initial polymers, alkyl urea/formaldehyde initial polymers, alkylene urea/formaldehyde initial polymers, etc.

In the emulsifying and dispersing step, electrophoretic particles are mixed with a hydrophobic dispersing medium to prepare a hydrophobic dispersion. This hydrophobic dispersion is emulsified and dispersed in an aqueous protective colloid solution in the same manner as described above. In emulsification and dispersion, the mixture is emulsified and dispersed by stirring it at 5000 rpm for 5 minutes with a high-speed rotating stirring apparatus such as Clearmix (manufactured by MTECHNIQUE Co., Ltd.). The amount of the amino resin component used is in the range of 1 to 200 parts by weight, preferably 10 to 60 parts by weight, relative to 100 parts by weight of the hydrophobic dispersion. When the amino resin component is an urea/formaldehyde initial polymer, this component may be added little by little or all at once to the system, or its starting material urea may be first dissolved in an aqueous medium followed by adding formaldehyde little by little or all at once to the system. The microcapsulation reaction is conducted preferably under acidic conditions, that is, pH 2.0 to 6.8, preferably 3.0 to 6.0 in the system. The conditions of the system may be regulated suitably depending on the type of the amino resin component used, and for example, when the melamine/formaldehyde initial polymer or alkylated methylol melamine is used, the pH is regulated preferably at 4.0 to 5.5, while in the case of the urea/formaldehyde initial polymer, the pH is regulated preferably at pH 2.0 to 4.5. The pH of the system is regulated at 3.0 to 6.8 and the system is heated at a predetermined temperature, whereby the polycondensation of the hydrophobic material can proceed on the surfaces of the dispersed particles thereof to give the objective microcapsules.

The amino resin component is an initial condensate of formaldehyde with urea, melamine, etc., and can be produced in a usual manner.

In the interfacial polymerization method, polyurethane, polyurea, polyurea/polyurethane, polyamide, etc. can be used as the wall material. In the interfacial polymerization method, hydrophobic monomers are added to a hydrophobic dispersing medium, the resulting hydrophobic dispersion is emulsified and dispersed in water, and then hydrophilic monomers are added and polymerized on the surfaces of oil droplets. When polyurethane, polyurea or polyurea/polyurethane is used as the wall material, the polyvalent isocyanate compound which can be used therein include those polyvalent isocyanates, polyvalent alcohols and polyvalent amines mentioned in the in-situ method. Generally, a polyvalent isocyanate is used as the hydrophobic monomer, while a polyvalent alcohol or polyvalent amine is used as the hydrophilic monomer. The amount of these monomers used is the same as described in the in-situ method.

When polyamide is used as the wall material, a polybasic acid halide may be used in place of the polyvalent isocyanate as the hydrophobic monomer, while a polyvalent amine may be used as the hydrophilic monomer. As the polybasic acid halide, sebacoyl chloride, terephthaloyl chloride, etc. may be used.

In the coacervation method, a conventionally known gelatin-gum arabic composite coacervation method can be used. Gelatin can react not only with gum arabic but also with sodium alginate, carrageenan, carboxymethyl cellulose, agar, polyvinyl benzene sulfonic acid, maleic anhydride copolymers, and anions of other surfactants.

In the emulsifying and dispersing step, electrophoretic particles are mixed with a hydrophobic dispersing medium to prepare a hydrophobic dispersion. 100 parts by weight of this hydrophobic dispersion is emulsified and dispersed in 120 parts by weight of 10% aqueous gelatin solution and 120 parts by weight of 10% gum arabic, heated at 40° C. In emulsification and dispersion, the mixture is emulsified and dispersed by stirring it at 5000 rpm for 5 minutes with a high-speed rotating stirring apparatus such as Clearmix (manufactured by MTECHNIQUE Co., Ltd.). After 600 parts by weight of water at 40° C. is added to this dispersion, the dispersion is adjusted to pH 4.3 with 10% acetic acid. The dispersion is then cooled to 10° C. or less, then 5 parts by weight of 37% formalin is added thereto, and the mixture is adjusted to pH 10 with 10% sodium hydroxide. The mixture is heated to 50° C. to cure capsules, whereby the objective microcapsules are obtained.

When the electrophoretic particle-containing microcapsules prepared from the various materials by the various methods described above are used as a display material, highly accurate display can be realized with high contrast.

In the present invention, there can be provided an electrophoresis reversible display medium using the microcapsules having an electrophoretic particle dispersion encapsulated therein, and such electrophoresis reversible display medium is for example in the following forms: an electrophoresis reversible display medium wherein the microcapsules having an electrophoretic particle dispersion encapsulated therein according to the present invention are charged into a space formed between two substrates at least one of which is transparent, wherein at least one of the substrates has an electrode on one side, and the surface of the electrode is arranged opposite the other substrate optionally via a spacer; an electrophoresis reversible display medium-wherein the microcapsules having an electrophoretic particle dispersion encapsulated therein according to the present invention are charged into a space divided discontinuously with a matrix material and formed between two substrates at least one of which is transparent, wherein at least one of the substrates has an electrode on one side, and the surface of the electrode is arranged opposite the other substrate optionally via a spacer; an electrophoresis reversible display medium wherein a coating layer consisting of a matrix material and the microcapsules having an electrophoretic particle dispersion encapsulated therein according to the present invention is formed in the side of an electrode formed on one substrate out of two transparent or opaque substrates; and an electrophoresis reversible display medium comprising an overcoat layer formed on a coating layer consisting of a matrix material and the microcapsules having an electrophoretic particle dispersion encapsulated therein according to the present invention, the coating layer being formed in the side of an electrode formed on one substrate out of two transparent or opaque substrates. The substrate mentioned in the present invention refers to both a substrate having an electrode surface and a substrate not having an electrode surface.

Figure 8:
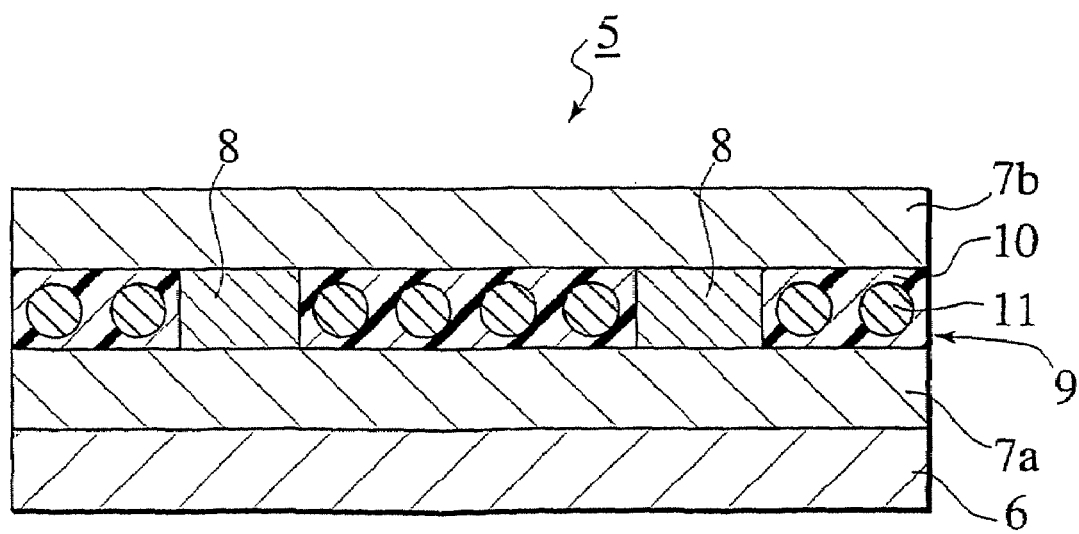
FIG. 8 is a sectional view of a microcapsule having electrophotoretic particle dispersion encapsulated therein.

FIG. 8 is a sectional view of the electrophoretic display medium. In the electrophoretic display medium 5 shown in FIG. 8, a pair of electrode substrates 7a and 7b are laminated on substrate 6 via spacer 8 arranged between the electrode substrates 7a and 7b. A reversible display recording layer 9 is formed around the spacer 8 arranged between the electrode substrates 7a and 7b, and the reversible display recording layer 9 is constituted by charging a matrix phase 10 formed from a matrix material described later, with a plurality of microcapsules 11 having an electrophoretic particle dispersion encapsulated therein.

The above reversible display recording layer 9 is obtained by dissolving, dispersing, suspending or emulsifying the electrophoretic particle-containing microcapsules 11 and the matrix material for forming the matrix phase 10, to prepare a coating solution, and then applying the resulting coating solution onto an electrode plate by a method such as wire bar coating, roll coating, blade coating, dip coating, spray coating, spin coating or gravure coating, followed by drying thereof. The electrode plate in this case includes electrodes comprising a glass plate or a plastic film having an electroconductive film such as ITO or an electroconductive metallic film such as aluminum, copper or gold formed thereon.

As the matrix material for forming the matrix phase 10, it is possible to employ the same material as in the wall material of the microcapsules or at least one member selected from polyethylene, polypropylene, polystyrene, polyvinyl chloride, polyvinylidene chloride, vinyl chloride/vinyl acetate copolymers, polyvinyl butyral, polyvinyl alcohol, polyethylene oxide, polypropylene oxide, ethylene/vinyl alcohol copolymers, polyacetal, acrylic resin, methyl cellulose, ethyl cellulose, phenol resin, fluorine resin, silicone resin, diene resin, polystyrene-based thermoplastic elastomer, polyolefin-based thermoplastic elastomer, polyurethane-based thermoplastic elastomer, polyester-based thermoplastic elastomer, polyphenylene ether, polyphenylene sulfide, polyether sulfone, polyether ketone, polyacrylate, aramid, polyimide, poly-p-phenylene, poly-p-xylene, poly-p-phenylene vinylene, polyhydantoin, polyparabenic acid, polybenzimidazole, polybenzothiazole, polybenzooxadiazole, polyquinoxaline, the thermosetting resin, active energy-curable resin, and mixtures thereof.

As the material for forming the overcoat layer, the material for forming the matrix material can be used. The overcoat layer is formed by applying a protective layer material composition containing a medium having the materials dissolved, dispersed, suspended or emulsified therein, a curing agent, a catalyst and/or a cocatalyst onto a display layer by wire bar coating, roll coating, blade coating, dip coating, spray coating, spin coating or gravure coating, or by sputtering or by a chemical gaseous phase method. The overcoat layer is desirably as thinner as possible in a range to function in protecting the surface layer, and is preferably about 0.1 to 100 µm, more preferably 0.3 to 30 µm.

EXAMPLES

Hereinafter, the present invention is described in more detail by reference to the Examples, but the scope of the present invention is not limited to the Examples. In the Examples, "parts" and "%" refer to "parts by weight" and "% by weight" respectively.

Example 1

A hydrophobic dispersing medium colored by dissolving 1 part by weight of an oil-soluble dye oil blue in 150 parts by weight of paraffin-based hydrocarbon isoper (Exxon Corporation) was prepared. 5 parts by weight of titanium dioxide (Ti-PURE R104 manufactured by DuPont) subjected to hydrophobic treatment was added as electrophoretic particles to the hydrophobic dispersing medium and dispersed therein for 10 minutes by a sonicator to give a hydrophobic dispersion. Separately, an aqueous solution wherein 20 parts by weight of styrene-maleic anhydride resin were dissolved as water-soluble polymer in 1500 parts by weight of deionized water was prepared. The previously prepared hydrophobic dispersion was then added to this aqueous solution and emulsified and dispersed for 10 minutes at a circumferential speed of 5 m/s with Clearmix manufactured by MTECHNIQUE Co., Ltd. Separately, a mixture consisting of 150 parts by weight of 37% formalin, 50 parts by weight of melamine and 400 parts by weight of deionized water was adjusted under stirring to pH 9.0 with an aqueous solution of caustic soda and reacted at 60° C. for 20 minutes to give a transparent melamine/formaldehyde condensate. In a step of forming microcapsules, this reaction solution was added to the previously emulsified dispersion introduced into a reactor equipped with a Max Blend blade manufactured by Sumitomo Heavy Industries, Ltd. and then reacted at 50° C. for 3 hours in-situ under stirring conditions at a circumferential speed of 0.75 m/s. The particle diameter of the resulting microcapsules having electrophoretic particles encapsulated therein was 15 µm, and the coefficient of variation was 36%. The particle diameter was determined from the average diameter of 100 particles observed under an optical microscope.

20 g of the microcapsules having electrophoretic particles encapsulated therein was then added to 80 g of 10 wt % aqueous polyvinyl alcohol solution, to prepare a dispersion coating solution. This coating solution was applied via an applicator having a 100 µm gap onto a glass plate (ITO film) having an ITO film and then dried to form a coating of the microcapsules having electrophoretic particles encapsulated therein, and another glass plate having an ITO film was placed thereon (such that the coating of the microcapsules was placed in the side of the ITO film), whereby an electrophoretic display medium was prepared. The electrophoretic display medium thus prepared was connected to a DC power source, and a voltage of ±100 V was applied thereto by switching the direction of an electric field at a rectangular frequency of 10 Hz. As a result, when the titanium dioxide particles were electrophoresed to the upper electrode, the display medium could be indicated in white (in this case, the electric field of the upper electrode was positive), and when the titanium dioxide particles were electrophoresed to the lower electrode, the medium could be indicated in blue (in this case, the electric field of the lower electrode was positive).

To examine the display performance of the resulting electrophoretic display medium, the reflected light intensity upon indication of white or blue was measured with 45° irradiation/0° incident light in the visible light range by using Photal MCPD-1000 manufactured by Otsuka Electronics Co. Ltd., and the blue/white reflectance was determined as contrast. As a result, the contrast was 1 (blue): 6.0 (white) For reference, the contrast of a blue solid print/white background of a newspaper was 1 (blue): 7.4 (white), and it was thus proven that the display contrast of the electrophoretic display medium was high.

Example 2

Microcapsules having an electrophoretic particle dispersion encapsulated therein were obtained in the same manner as in Example 1 except that T.K. Filmics manufactured by Tokushu Kika Kogyo Co., Ltd. was used as the high-speed rotating stirring apparatus, and a cylindrical screen-type stirring wheel (clearance from the container, 2 mm; vent diameter, 2 mm) was fitted to the stirring part, and emulsification and dispersion were performed at circumferential speed of 10 m/s for 2 minutes. The particle diameter of the microcapsules was 17 µm, and the coefficient of variation was 32%. The measured contrast of a display using the microcapsules was 1 (blue): 6.4 (white), and it was proven that the display contrast of the electrophoretic display medium was high.

Example 3

A hydrophobic dispersing medium colored by dissolving 1 part by weight of an oil-soluble dye oil blue in 150 parts by weight of paraffin-based hydrocarbon isoper (Exxon Corporation) was prepared. 5 parts by weight of titanium dioxide (Ti-PURE R104 manufactured by DuPont) subjected to hydrophobic treatment were added as electrophoretic particles to the hydrophobic dispersing medium and dispersed therein for 10 minutes by a sonicator to prepare a hydrophobic dispersion, and then 11.1 parts by weight of an adduct of 3 moles of tolylene diisocyanate and 1 mole of trimethylol propane were added thereto. Separately, an aqueous solution wherein 15 parts by weight of polyvinyl alcohol were dissolved as water-soluble polymer in 1500 parts by weight of deionized water was prepared. The previously prepared hydrophobic dispersion was then added to this aqueous solution and emulsified and dispersed for 10 minutes at a circumferential speed of 5 m/s with Clearmix manufactured by MTECHNIQUE Co., Ltd. In a step of forming microcapsules, 5.6 parts by weight of an aqueous solution containing 5.6 parts by weight of triethylene tetramine was separately prepared, and added to the previously emulsified dispersion introduced into a reactor equipped with a turbine blade, and then reacted at 50° C. for 5 hours by interfacial polymerization under stirring conditions at a circumferential speed of 0.75 m/s. The particle diameter of the resulting microcapsules having electrophoretic particles encapsulated therein was 20 µm, and the coefficient of variation was 37%. The measured contrast of a display using the microcapsules was 1 (blue): 6.1 (white), and it was proven that the display contrast of the electrophoretic display medium was high.

Example 4

A hydrophobic dispersing medium colored by dissolving 1 part by weight of an oil-soluble dye oil blue in 150 parts by weight of paraffin-based hydrocarbon isoper (Exxon Corporation) was prepared. 5 parts by weight of titanium dioxide (Ti-PURE R104 manufactured by DuPont) subjected to hydrophobic treatment were added as electrophoretic particles to the hydrophobic dispersing medium and dispersed therein for 10 minutes by a sonicator to prepare a hydrophobic dispersion, and then 3.5 parts by weight of methyl methacrylate, 3.5 parts by weight of isobutyl methacrylate, 0.5 part by weight of ethylene glycol dimethacrylate, and 0.1 part by weight of benzoyl peroxide were added and dissolved therein. Separately, an aqueous solution wherein 5 parts by weight of polyvinyl alcohol were dissolved as water-soluble polymer in 500 parts by weight of deionized water was prepared. The previously prepared hydrophobic dispersion was then added to this aqueous solution and emulsified and dispersed for 10 minutes at a circumferential speed of 5 m/s with Clearmix manufactured by MTECHNIQUE Co., Ltd. In a step of forming microcapsules, it was added to the previously emulsified dispersion introduced into a reactor equipped with a turbine blade, and then reacted at 80° C. for 3 hours in-situ under stirring conditions at a circumferential speed of 0.75 m/s. The particle diameter of the resulting microcapsules having electrophoretic particles encapsulated therein was 23 µm, and the coefficient of variation was 40%. The measured contrast of a display using the microcapsules was 1 (blue): 6.0 (white) and it was proven that the display contrast of the electrophoretic display medium was high.

Example 5

A hydrophobic dispersing medium colored by dissolving 1 part by weight of an oil-soluble dye oil blue in 150 parts by weight of paraffin-based hydrocarbon isoper (Exxon Corporation) was prepared. 5 parts by weight of titanium dioxide (Ti-PURE R104 manufactured by DuPont) subjected to hydrophobic treatment were added as electrophoretic particles to the hydrophobic dispersing medium and dispersed therein for 10 minutes by a sonicator to prepare a hydrophobic dispersion. Separately, an aqueous solution wherein 200 parts by weight of 10% aqueous gelatin solution and 200 parts by weight of 10% aqueous gum arabic solution were mixed with 600 parts by weight of deionized water was prepared and heated to 40° C. The previously prepared hydrophobic dispersion was then added to this aqueous solution, and emulsified and dispersed for 10 minutes at a circumferential speed of 5 m/s with Clearmix manufactured by MTECHNIQUE Co., Ltd. In a step of forming microcapsules, this dispersion kept at 40° C. was introduced into a reactor equipped with a screw blade, and then 500 parts by weight of deionized water were added thereto under stirring at a circumferential speed of 0.75 m/s, and the pH of the system was gradually decreased to 4.2 with 10% aqueous acetic acid, to form a gelatin/gum arabic composite coacervation. The temperature in the system was decreased to 10° C., and 20 parts by weight of 37% formalin were added thereto, and the mixture was cured by adjustment to pH 9.0 with 10% aqueous caustic soda. The particle diameter of the resulting microcapsules having electrophoretic particles encapsulated therein was 19 μm, and the coefficient of variation was 40%. The measured contrast of a display using the microcapsules was 1 (blue): 6.0 (white), and it was proven that the display contrast of the electrophoretic display medium was high.

Example 6

Microcapsules having an electrophoretic particle dispersion encapsulated therein were obtained in the same manner as in Example 5 except that T.K. Filmics manufactured by Tokushu Kika Kogyo Co., Ltd. was used as the high-speed rotating stirring apparatus, and a cylindrical screen-type stirring wheel (clearance from the container, 2 mm; vent diameter, 2 mm) was fitted to the stirring part, and emulsification and dispersion were performed in a flow system at a circumferential speed of 10 m/s for a retention time of 60 seconds. The particle diameter of the microcapsules was 25 μm, and the coefficient of variation was 31%. The measured contrast of a display using the microcapsules was 1 (blue): 7.3 (white), and it was proven that the display contrast of the electrophoretic display medium was high.

Example 7

10 parts by weight of titanium dioxide (CR-50, manufactured by Ishihara Sangyo Kaisha, Ltd.) and 10 parts by weight of titanium black (Thilack D, manufactured by Ako Kasei Co., Ltd.) as electrophoretic particles, and 2.5 parts by weight of oleic acid were added to 150 parts by weight of paraffin-based hydrocarbon isoper (Exxon Corporation) and dispersed for 10 minutes with a sonicator, to prepare a hydrophobic dispersion. Separately, an aqueous solution wherein 200 parts by weight of 10% aqueous gelatin solution and 200 parts by weight of 10% aqueous gum arabic solution were mixed with 600 parts by weight of deionized water was prepared and heated to 40° C. The previously prepared hydrophobic dispersion was then added to this aqueous solution, and then emulsified and dispersed in a flow system at a circumferential speed of 7 m/s for a retention time of 60 seconds with T.K. Filmics (manufactured by Tokushu Kika Kogyo Co., Ltd.) having a cylindrical screen-type stirring wheel (clearance from the container, 2 mm; vent diameter, 3 mm) fitted to the stirring part. In a step of forming microcapsules, this dispersion kept at 40° C. was charged into a reactor equipped with a Max Blend blade manufactured by Sumitomo Heavy Industries, Ltd., and then 500 parts by weight of deionized water were added thereto under stirring at a circumferential speed of 0.75 m/s, and the pH was gradually decreased to pH 4.2 with 10% aqueous acetic acid to form a gelatin/gum arabic composite coacervation. The temperature of the system was decreased to 10° C. or less, and 20 parts by weight of 37% formalin were added thereto, and the pH was adjusted to 9.0 with 10% aqueous caustic soda to cure it. The particle diameter of the resulting microcapsules having an electrophoretic particle dispersion encapsulated therein was 32 μm, and the coefficient of variation was 28%. The measured contrast of a display using the microcapsules was 1 (black): 10.2 (white). The contrast of a black solid print/white background of a newspaper was 1 (black): 9.5 (white), and it was thus proven that the display contrast of the electrophoretic display medium was high.

Comparative Example 1

In this comparative example, microcapsules having an electrophoretic particle dispersion encapsulated therein were obtained in the same manner as in Example 1 except for use of a rotating stirring apparatus wherein the circumferential speed at the end of the stirring part of the stirring apparatus was 1.5 m/s, and the distance between the end of the stirring part and the fixed part was 5 mm. The particle diameter of the microcapsules was 28 μm, and the coefficient of variation was 75%. An electrophoretic display medium was prepared in the same manner as in Example 1, and the reflected light intensity upon indication of white or blue was determined as contrast, and as a result, the contrast was 1 (blue): 2.5 (white).

Comparative Example 2

In this comparative example, microcapsules having an electrophoretic particle dispersion encapsulated therein were obtained in the same manner as in Example 2 except for use of a rotating stirring apparatus wherein the circumferential speed at the end of the stirring part of the stirring apparatus was 55 m/s, and the distance between the end of the stirring part and the fixed part was 25 mm. The particle diameter of the microcapsules was 6.8 μm, and the coefficient of variation was 64%. An electrophoretic display medium was prepared in the same manner as in Example 1, and the reflected light intensity upon indication of white or blue was determined as contrast, and as a result, the contrast was 1 (blue): 3.1 (white).

Comparative Example 3

In this comparative example, microcapsules having an electrophoretic particle dispersion encapsulated therein were obtained in the same manner as in Example 7 except that Clearmix manufactured by MTECHNIQUE Co., Ltd. was used as the high-speed rotating stirring apparatus, and microcapsulation was performed under the stirring condition of a circumferential speed of 6 m/s. The particle diameter of the microcapsules was 5.8 μm, and the coefficient of variation was 55%. An electrophoretic display medium was prepared in the same manner as in Example 1, and the reflected light intensity upon indication of white or black was determined as contrast, and as a result, the contrast was 1 (black): 4.7 (white).

INDUSTRIAL APPLICABILITY

According to the method of producing microcapsules having an electrophoretic particle dispersion encapsulated therein according to the present invention, microcapsules having small and uniform particle diameters can be produced, and simultaneously the content of electrophoretic particles in the microcapsules can be made uniform, and thus the microcapsules having an electrophoretic particle dispersion encapsulated therein can be used to constitute a reversible display medium such as a display to achieve highly accurate and high-contrast display, and therefore the industrial applicability thereof is remarkable.

The invention claimed is:

1. A method of producing microcapsules having an electrophoretic particle dispersion encapsulated comprising:

emulsifying and dispersing in a hydrophilic medium a hydrophobic dispersion having electrophoretic particles dispersed in a hydrophobic medium by using a first stirring apparatus transferring said hydrophobic dispersion emulsified and dispersed in the hydrophilic medium to a second stirring apparatus; and forming microcapsules of the said hydrophobic dispersion emulsified and dispersed in the hydrophilic medium under stirring with a stirring blade of said second stirring apparatus, wherein in said first stirring apparatus, a circumferential speed at the end of a stirring part is 2 m/s to 90 m/s, and a distance (a) between the end of the stirring part and that immobile part of the stirring apparatus which is nearest to the end of the stirring part is 0 mm<(a)<20 mm, in said second stirring apparatus a circumferential speed of the stirring blade is 0.2 m/s to 5.0 m/s, and the second stirring apparatus is accommodated in a reaction container so as to enable stirring of the stirring blade used in forming microcapsules of the emulsified and dispersed hydrophobic dispersion, a ratio (d1/d2) of a blade diameter (d1) of the stirring blade to a inner diameter (d2) of the reaction container is 0.4 to 0.9, and a ratio (d1/h1) of the blade diameter (d1) to the total height (h1) of the stirring blade is 0.3 to 1.5.

2. The method according to claim 1, wherein the first stirring apparatus is a container in a cylindrical shape and a stirring wheel which is a cylinder arranged in the container, having approximately the same shape as that of the container, and provided with plural vents in the periphery thereof.

3. The method according to claim 1, wherein said electrophoretic particles comprise two or more kinds of colored particles different from one another in tint and electrophoretic mobility.

4. The method according to claim 1 wherein the microcapsules having an electrophoretic particle dispersion encapsulated have a particle diameter of 0.5 to 100 μm and a particle diameter distribution of 50% or less in terms of coefficient of variation.

5. The method according to claim 1 wherein the microcapsules having an electrophoretic particle dispersion encapsulated have a particle diameter of 5 to 50 μm and a particle diameter distribution of 50% or less in terms of coefficient of variation.

6. The method according to claim 1 wherein the microcapsules having an electrophoretic particle dispersion encapsulated have a particle diameter of 0.5 to 100 μm and a particle diameter distribution of 40% or less in terms of coefficient of variation.

7. The method according to claim 1 wherein the microcapsules having an electrophoretic particle dispersion encapsulated have a particle diameter of 5 to 50 μm and a particle diameter distribution of 40% or less in terms of coefficient of variation.

8. The method according to claim 1, wherein the hydrophobic dispersing medium comprises at least one organic solvent from the group consisting of an aromatic hydrocarbon, an aliphatic hydrocarbon, a paraffin based hydrocarbon, a halogenated hydrocarbon, an organic phosphate, a phthalate, a carboxylate, isopropyl biphenyl, isoamyl biphenyl, a chlorinated paraffin, diisopropyl naphthalene, 1,1-ditriethane, 1,2-ditolylethane, 2,4-ditertiary aminophenol and N,N-dibutyl-2-butoxy-5-tertiary octylaniline.

9. The method according to claim 1, wherein the hydrophilic medium comprises water or a mixture of water and a water-miscible organic solvent.

10. The method according to claim 1, wherein the hydrophilic dispersing medium further comprises a dispersion stabilizer.

* * * * *